United States Patent
Tramoni

(10) Patent No.: US 9,626,614 B2
(45) Date of Patent: Apr. 18, 2017

(54) PROTECTION OF A RADIO FREQUENCY TRANSMIT-RECEIVE TERMINAL AGAINST ELECTROMAGNETIC DISTURBANCES

(71) Applicant: STMicroelectronics (Rousset) SAS, Rousset (FR)

(72) Inventor: Alexandre Tramoni, Le Beausset (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 460 days.

(21) Appl. No.: 13/663,319

(22) Filed: Oct. 29, 2012

(65) Prior Publication Data
US 2013/0119134 A1  May 16, 2013

(30) Foreign Application Priority Data
Nov. 10, 2011  (FR) ..................... 11 60271

(51) Int. Cl.
| | | |
|---|---|---|
| G06K 19/06 | (2006.01) | |
| G08B 13/14 | (2006.01) | |
| G06K 19/07 | (2006.01) | |
| G06K 7/10 | (2006.01) | |

(52) U.S. Cl.
CPC ..... *G06K 19/0726* (2013.01); *G06K 7/10237* (2013.01)

(58) Field of Classification Search
USPC ................... 235/45.1, 492; 455/41.1, 77; 340/572.1–572.7
See application file for complete search history.

(56) References Cited

U.S. PATENT DOCUMENTS

| | | | |
|---|---|---|---|
| 7,248,892 B2* | 7/2007 | White et al. ............... | 455/550.1 |
| 7,665,664 B2* | 2/2010 | Charrat et al. ................ | 235/451 |
| 2007/0045418 A1* | 3/2007 | Charrat et al. ................ | 235/451 |
| 2008/0018433 A1* | 1/2008 | Pitt-Pladdy .................. | 340/10.4 |
| 2008/0194200 A1* | 8/2008 | Keen et al. .................. | 455/41.1 |
| 2009/0247079 A1* | 10/2009 | Charles et al. .............. | 455/41.1 |
| 2011/0243120 A1* | 10/2011 | Ginsburg et al. ............. | 370/345 |

* cited by examiner

*Primary Examiner* — Daniel Hess
(74) *Attorney, Agent, or Firm* — Seed IP Law Group LLP

(57) ABSTRACT

An antenna circuit for a device of transmission/reception by inductive coupling, including a first inductive element in parallel with a capacitive element and, between each node of the parallel association and two terminals of a switch, a second inductive element.

23 Claims, 2 Drawing Sheets

PROTECTION OF A RADIO FREQUENCY TRANSMIT-RECEIVE TERMINAL AGAINST ELECTROMAGNETIC DISTURBANCES

BACKGROUND

Technical Field

The present disclosure generally relates to electronic circuits and, more specifically, to contactless transmit-receive terminals capable of operating in a first so-called reader mode, where the terminal communicates with a distant electromagnetic transponder, and in a so-called card mode, where the terminal operates as an electromagnetic transponder with respect to another terminal.

Description of the Related Art

A contactless card reader emits a magnetic field towards an oscillating circuit of a card generally having no autonomous power supply. In the reader-to-card direction, the data are generally coded and transmitted in amplitude modulation of a carrier of excitation of an oscillating circuit of the reader. In the card (transponder) to reader direction, the card circuits modulate the load formed by the oscillating circuit of the card on the magnetic field of the reader, with a circuit generally called a retromodulation circuit, for example, by short-circuiting the antenna circuit by means of a switch.

A radio frequency terminal transmitting data by inductive coupling, capable of operating in card mode and in reader mode, is capable of generating the data frame coding and decoding according to different protocols. Near field communication circuits (NFC) are capable of operating in card mode and in reader mode. Such circuits are commonly used in portable telecommunication devices such as cell phones. Various standards set the communication protocols.

In card mode, the power supply of the circuits is generally induced by the magnetic field generated by the reader, which forms the communication channel between the card and the reader. The alternating current (A.C.) signal exciting the oscillating circuit of the reader then forms a remote-supply carrier for the card.

In reader mode, the terminal is powered (for example, by a battery or by a connection to the power distribution system) to emit the magnetic field towards a card.

In dedicated devices, the antenna (or oscillating circuit inductance) of the reader is often tuned to the transmit frequency (for example, on the order of 13.56 MHz for ISO standard 14443) and matched to the impedance of the A.C. signal generator, while the antenna (inductance of the resonant circuit) of a card is often tuned to the operating frequency of the system (for example, 13.56 MHz).

If the reader antenna is tuned, but mismatched, the transmission is not optimal. Further, the reflected wave due to the mismatching disturbs the detection of the signal retromodulated by the card. Conversely, if the card antenna is matched but off-tune, the power recovery is not optimized.

As a result, antenna circuits are generally not compatible with an operation in card mode and in reader mode. In particular, it is difficult to use a single antenna to design a device which can operate both in reader mode and in card mode.

Another issue is linked to the need to associate filters against electromagnetic disturbances (electromagnetic interference, or EMI, filters) to the transmission circuit. Such filters are generally interposed between the electronic circuits of the transceiver device and the antenna.

U.S. Pat. No. 7,665,664 describes a reader by inductive coupling equipped with means for extracting a power supply voltage in a card mode operation by extracting the electric power directly in the antenna circuit of the reader without using a dedicated antenna coil. In this circuit, EMI-type low-pass filters are incorporated into the antenna circuit and are electrically interposed between terminals of the antenna circuit intended to be connected to a transmit circuit and series capacitors connected across the antenna. The architecture is of differential type and the antenna includes a grounded midpoint, two capacitors in parallel between each terminal of the antenna and the ground taking part in the tuning of the oscillating circuit. In card mode, the input terminals of the antenna circuit are short-circuited by a rectifying bridge. The capacitive elements taking part in the oscillating circuit as well as those in series with the low-pass filters then generate disturbances, which result in a detuning of the antenna in card mode, a loss of amplitude of the received signal, and in addition or alternatively, a deformation of the received wave.

BRIEF SUMMARY

An embodiment overcomes all or part of the disadvantages of known devices of transmission/reception by inductive coupling.

Another embodiment provides an architecture in which the provision of filters against electromagnetic disturbances does not adversely affect the operation in card mode.

Another embodiment provides a device in which the operation is improved both in card mode and in reader mode.

Thus, an embodiment provides an antenna circuit for a device of transmission/reception by inductive coupling, including a first inductive element in parallel with a capacitive element and, between each node of the parallel association and two terminals of a switch, a second inductive element.

According to an embodiment, the terminals of the switch are intended to be connected to a circuit for generating an A.C. signal intended to excite the oscillating circuit formed by the antenna circuit.

According to an embodiment, said nodes of the parallel association are intended to be connected to a circuit for interpreting detected signals.

Another embodiment provides a device of transmission/reception by inductive coupling. The device includes an antenna circuit, a circuit for generating an A.C. signal intended to excite the antenna circuit, a circuit for interpreting signals detected by the antenna circuit, and a circuit for controlling the switch.

According to an embodiment, the switch is in off position when the device will transmit the A.C. signal and operate in reader mode.

According to an embodiment, the switch is in on position when the device will transmit data and operate in card mode.

According to an embodiment, the second inductive elements are sized so that, at the frequency of the A.C. transmission signal, the antenna circuit is matched to the output impedance of the A.C. signal generation circuit.

According to an embodiment, the sum of the second inductive elements is selected so that the oscillating circuit is tuned to a frequency of an A.C. signal received from another device in the card mode operation.

The foregoing and other features and advantages will be discussed in detail in the following non-limiting description of specific embodiments in connection with the accompanying drawings.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements and angles are not drawn to scale, and some of these elements are enlarged and positioned relative to other elements to improve drawing legibility. One or more embodiments are described hereinafter with reference to the accompanying drawings in which.

DETAILED DESCRIPTION

Figure 1:
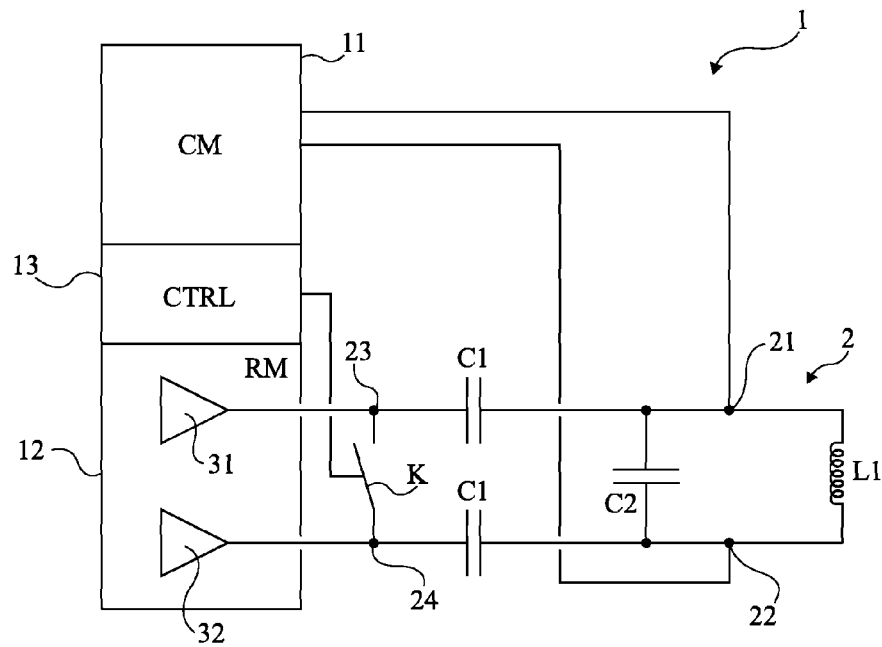
FIG. 1 is a functional block diagram of a known reader-card device.

The same elements have been designated with the same reference numerals in the different drawings. For clarity, only those elements which are useful to the understanding of the described embodiments have been shown and will be detailed. In particular, the data transmission protocols in reader mode or in card mode have not been detailed; the described embodiments being compatible with usual protocols, which are generally standardized, and thus easily available. Further, the applications of the reader-card devices have not been detailed; the described embodiments being here again compatible with the different current uses of dual-mode or combined devices. For example, they may be used as terminals of communication with electronic tags capable of switching to the card mode to transfer data from a terminal to a neighboring terminal, all the way to a server. They may also be used as portable devices capable of operating, according to applications, in card mode (in a transport application, for example) and in reader mode.

FIG. 1 is a block diagram of an example of a combined, or reader-card, device 1 such as described in US patent application 2009/0247079 of the applicant (B8794, 08-RO-027/029). This diagram is functional in that the different elements used for the card mode and for the reader mode have not been detailed and have been shown in separate blocks. Thus, a card mode block 11 (CM) symbolizes the different circuits used in card mode, a reader mode block 12 (RM) symbolizes the different circuits used in reader mode, and a control block 13 (CTRL) symbolizes the different circuits used to select the mode and to synchronize the operation. In practice, some circuits may however be shared by the two functions.

An oscillating circuit or antenna circuit 2 includes, between terminals 21 and 22 of an antenna L1, a capacitive element C2. Terminals 21 and 22 are further connected to block 11 of the card mode to sample an alternating current (A.C.) signal detected in the field of a reader. The circuits of the reader mode include two output amplifiers 31 and 32 respectively connected by identical capacitive elements C1 to terminal 21 and to terminal 22. A switch K connects the respective outputs 23 and 24 of amplifiers 31 and 32.

Switch K is controlled by control block 13 towards an off position when the device must operate in reader mode and towards an on position when the device must operate in card mode. In reader mode, switch K is off and capacitors C1 take part in the impedance matching circuit at the carrier frequency. In card mode, capacitive elements C1 are both in series and this series association is in parallel on capacitive element C2. Half the value of a capacitive element C1 thus adds to the value of capacitive element C2. Amplifiers 31 and 32 are of three-state type to have, in card mode, a high output impedance state.

To add filters against electromagnetic disturbances to the architecture of the device of FIG. 1, it could have been devised to insert therein the low-pass filters provided by above-mentioned document U.S. Pat. No. 7,665,664. However, this does not optimize the system operation. In particular, in card mode, the capacitive elements of the filters generate additional disturbances.

Figure 2:
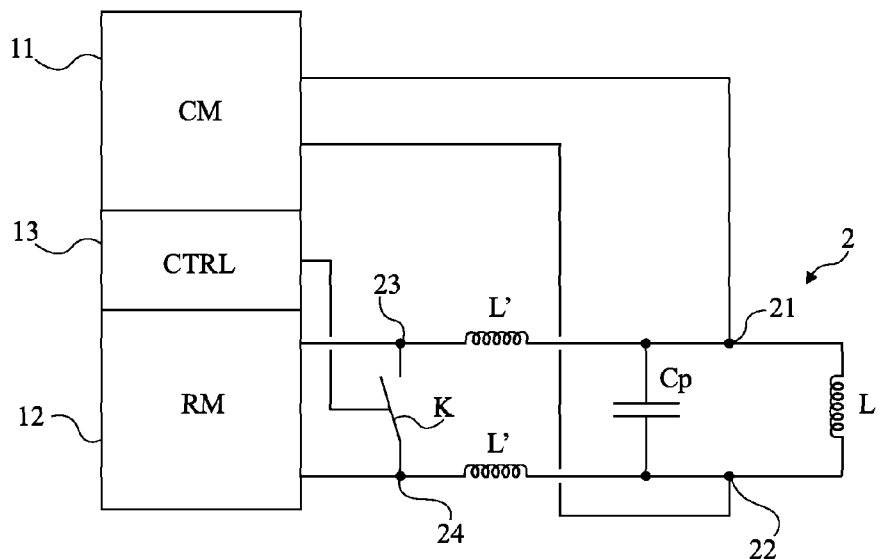
FIG. 2 is a functional block diagram of an embodiment of reader-card device.

FIG. 2 is a functional block diagram of an embodiment of a combined device.

As compared with the circuit of FIG. 1, capacitive elements C1 have been replaced with inductive elements L'. The rest of the circuit is not modified. For simplification, output amplifiers 31 and 32 (FIG. 1) of the reader circuit have not been illustrated but are present.

Thus, inductances L' of same value are present between two output terminals 23 and 24 of block 12 (or two input terminals of antenna circuit 2), and respective terminals 21 and 22 of the antenna, here referred to as L. A capacitive element Cp is in parallel on inductance L between terminals 21 and 22. Different reference numerals have been used for inductive and capacitive elements L and Cp, with respect to elements L1 and C2 of FIG. 1, to show that the values of these elements are not necessarily identical.

Switch K has the same function as previously, that is, it is off in a reader mode operation where inductive elements L' take part, with capacitive element Cp, in the forming of a low-pass filter against electromagnetic disturbances, and it is on in a card mode operation to place the two inductances L' in series and to connect this series association in parallel with antenna L, thus taking part in an increase of the value of the inductive element of the oscillating circuit.

Figure 3A:
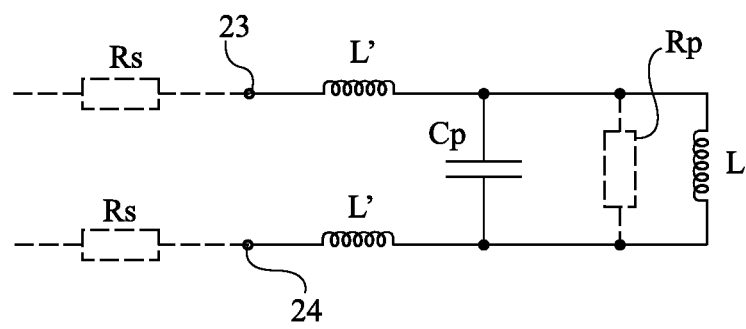
FIGS. 3A and 3B illustrate two configurations of the oscillating circuit of the device of FIG. 2.
Figure 3B:
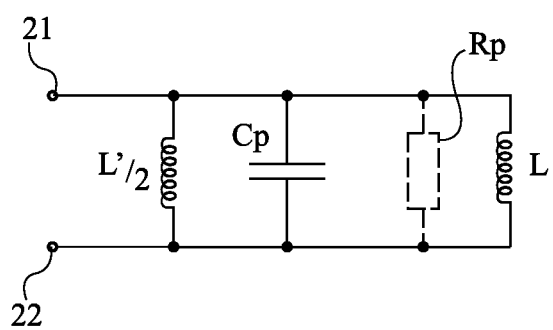

FIGS. 3A and 3B illustrate the two configurations of the oscillating circuit of the device of FIG. 2 according to the switch position.

FIG. 3A illustrates the equivalent electric diagram of circuit 2 of FIG. 2 in reader mode. The series resistor (parasitic resistor of antenna L) placed in parallel (referred to as Rp) on inductance L has been illustrated in dotted lines, as well as series resistors Rs (output impedances) of circuit 12.

FIG. 3B illustrates the equivalent electric diagram of circuit 2 of FIG. 2 in card mode with, similarly, resistor Rp placed in parallel on the inductance. Inductive elements L' show an equivalent inductance L'/2 which adds to inductance L of the antenna.

The passing from the parallel equivalent model (FIG. 3A) to the series equivalent model (FIG. 3B), and conversely, is usually performed with the following relations (to simplify the notations, reference is made to L, Rp, L', and Cp to designate the values of the concerned elements):

$$Xs = Qs \cdot Rs,$$

where Xs is the series admittance of the antenna circuit and where Qs is the quality factor of the series elements of the antenna circuit.

Admittance Xs is preferably matched to the output admittance of the transmit circuits. Factor Qs is equal to $$\sqrt{\frac{Rp}{Rs} - 1}.$$

Series resistance Rs is negligible as compared with the resistance, referred to as Rp, of inductive element L placed in parallel on the oscillating circuit.

It can then be written that Xs is approximately equal to $\sqrt{Rs \cdot Rp}$.

In the configuration of FIG. 3B (parallel structure), parallel admittance Xp is due to the presence of capacitance Cp and can be written as Rp/Qp, where Qp is the quality factor of the parallel elements.

The oscillating circuit components are sized according to the tuning and matching frequencies. It is in particular desired for the quality factors of the parallel and series elements to be equal and to be able to written as:

$$Qs = Qp$$
$$= \sqrt{\frac{Rp}{Rs} - 1}$$

Series and parallel admittances Xs and Xp approximately equal to $\sqrt{Rs \cdot Rp}$ are thus obtained.

Inductive elements L' are sized so that, at the frequency of the A.C. transmission signal, the antenna circuit is matched to the output impedance of the A.C. signal, and that their sum is such that the oscillating circuit is tuned to a frequency of an A.C. signal received from another device in the card-mode operation. Capacitive element Cp is sized by taking into account the value of elements L' to form an EMI low-pass filter.

Taking into account the above-discussed conditions, the values of elements Cp and L' can be determined as follows.

Consider a buffer (amplifier 31 or 32) of internal impedance Rs and an antenna L of impedance R1+jLω. It is started by calculating the parallel equivalent model of this circuit.

The equivalent model of the antenna is made parallel by the following equations:

$$Q = \frac{Xs}{R1}$$
$$= \frac{L\omega}{R1},$$
$$Rp = (Q^2 + 1)R1$$
and
$$Lp = \frac{Xp}{\omega}$$
$$= \frac{Rp}{\omega Q},$$

where Rp designates resistance R1 placed in parallel on inductance L, Lp designates the corresponding value of inductance L (placed in parallel) on resistor Rp, Q the quality factor of the antenna alone, and Xp the parallel admittance of the complete antenna circuit.

The matching circuit can then be replaced with a matching with two elements and a so-called "L" layout.

To model the circuit, it is desired to cancel the imaginary part of the charge impedance with a theoretical capacitance Cshunt in parallel on the antenna. This capacitance forms with inductance Lp a resonant circuit at the frequency at which the matching is desired to be performed. Thereby, at the resonance frequency, couple Lp, Cshunt resonates and has an infinite impedance. Thus, the imaginary part of the antenna is annihilated.

$$Cshunt = \frac{1}{(2 \cdot \pi \cdot f)^2 \cdot Lp},$$

whereby $$Xshunt = \frac{1}{Cshunt \cdot \omega}$$

where f is the matching frequency and Xshunt is the admittance of capacitance Cshunt.

Previously-defined admittances Xs and Xp are calculated by means of the following equations.

$$Qs = Qp$$
$$= \sqrt{\frac{Rp}{Rs} - 1};$$
$$Xs = Qs \cdot Rs;$$
$$Xp = \frac{Rp}{Qp}$$

Knowing Xs and Xp, the values of Cp and of L' can be deduced:

$$Cp = \frac{1}{Xt\omega}$$

and $$L' = X_S \omega,$$

and $$Xt = \frac{-Xp(Xshunt)}{-Xp + Xshunt}.$$

It is now possible to share a same antenna for a device intended to operate in reader mode and in card mode while being compatible with a filtering of electromagnetic disturbances in reader mode. The provided circuit reduces the number of capacitive elements to be used and thus decreases the bulk.

It should be noted that the specific layout of the capacitive and inductive elements of the oscillating circuits allows an L matching resulting in a circuit tuned in card mode.

Various embodiments have been described, various alterations and adaptations are within the abilities of those skilled in the art. In particular, the selection of the values to be given to the inductive elements according to the antenna used is within the abilities of those skilled in the art based on the functional indications given hereabove and on the matching and tuning frequencies respectively intended for the reader mode and for the card mode. Further, although the embodiments have been more specifically described in relation with an example applied to standards 14443, they more generally apply to any radio frequency transmit/receive system, where a device is capable of operating in reader mode and in card mode. Further, the practical implementation of the described embodiments is within the abilities of those skilled in the art based on the functional indications given hereabove. In particular, the function of switch K may be ensured by switches internal to blocks 11 and 13.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. An antenna circuit coupleable to a device of transmission/reception by inductive coupling, comprising:
   a first inductive element electrically coupled in a parallel association with a capacitive element, the parallel association having a first node directly connected to a first end of the first inductive element and a first end of the capacitive element, the parallel association having a second node directly connected to a second end of the second inductive element and a second end of the capacitive element;
   a first dual purpose inductance electrically coupled directly between the first node of the parallel association and a first terminal of a switch; and
   a second dual purpose inductance electrically coupled directly between the second node of the parallel association and a second terminal of the switch, the first and second dual purpose inductances configurable by the switch to cooperate as a second inductive element in the parallel association.

2. The antenna circuit of claim 1 wherein the terminals of the switch are connectable to a circuit that generates an alternating current (A.C.) signal to excite the antenna circuit as an oscillating circuit.

3. The antenna circuit of claim 1 wherein said nodes of the parallel association are connectable to a circuit that interprets detected signals.

4. The antenna circuit of claim 1, comprising:
   a circuit to generate an alternating current (A.C.) signal that excites the antenna circuit;
   a circuit to interpret signals detected by the antenna circuit; and
   a circuit to control the switch.

5. The antenna circuit of claim 4 wherein the switch is in an off position when the antenna circuit is configured to transmit the A.C. signal and configured to operate in reader mode.

6. The antenna circuit of claim 4 wherein the switch is in an on position when the antenna circuit is configured to transmit data and configured to operate in card mode.

7. The antenna circuit of claim 6 wherein a sum of the first and second dual purpose inductances is selected to tune the excited antenna circuit to a frequency of an A.C. signal received from another device in the card mode operation.

8. The antenna circuit of claim 4 wherein the first and second dual purpose inductances are sized to match, at the frequency of the A.C. transmission signal, the antenna circuit to the output impedance of the A.C. signal generation circuit.

9. A method to operate an antenna circuit of an inductively coupled transmission/reception device, comprising:
   controlling a switch, the switch having a first terminal, a second terminal, and a control terminal, wherein the first terminal is electrically coupled directly to a first dual purpose inductance, the first dual purpose inductance electrically coupled directly to one end of a parallel arrangement including a capacitive element and an antenna, wherein the second terminal is electrically coupled directly to a second dual purpose inductance, the second dual purpose inductance electrically coupled directly to an opposite end of the parallel arrangement, the controlling including opening the switch when the transmission/reception device is operating in a reader mode and closing the switch when the transmission/reception device is operating in a card mode.

10. The method of claim 9, comprising:
    generating an alternating current (A.C.) signal to excite the antenna as an oscillating circuit.

11. The method of claim 10, comprising:
    summing the first and second dual purpose inductances to tune the oscillating circuit to a frequency of an A.C. signal received from another device.

12. The method of claim 9, comprising:
    interpreting detected signals induced on the antenna when the switch is open.

13. The method of claim 9, comprising:
    transmitting data when the switch is closed.

14. A device having an antenna circuit inductively coupled to a transmission/reception circuit, comprising:
    an antenna inductance;
    a first dual purpose inductance;
    a second dual purpose inductance,
    a capacitive element connected in a parallel association with the antenna inductance, the parallel connection formed at a first node means and a second node means for electrically connecting the parallel association directly to the first and second dual purpose inductances;
    a switch having a first terminal and a second terminal, wherein the first dual purpose inductance is coupled between the first switch terminal and the first node means, and wherein the second dual purpose inductance is coupled between the second switch terminal and the second node means; and
    a control circuit to open and close the switch wherein closing the switch places the first and second dual purpose inductances in a series arrangement with each other, the series arrangement connected in parallel with the antenna inductance and the capacitive element.

15. The device of claim 14, comprising:
    a reader mode circuit to generate an alternating current (A.C.) signal configured to excite the antenna circuit as an oscillating circuit, the reader mode circuit controllable by the control circuit.

16. The device of claim 15, comprising:
    a circuit to interpret signals induced on the antenna inductance.

17. The device of claim 14, comprising:
    a card mode circuit configured to transmit data, the card mode circuit controllable by the control circuit.

18. The device of claim 14 wherein the first and second dual purpose inductances are sized to match, at a frequency of an A.C. transmission signal, the antenna inductance to an output impedance of an A.C. signal generation circuit.

19. The device of claim 14 wherein the sum of the first and second dual purpose inductances is selected to tune an oscillating circuit to a frequency of an A.C. signal received from another device in a card mode operation.

20. An antenna circuit coupleable to a device of transmission/reception by inductive coupling, comprising:

a switch having first and second terminals;
an inductive element;
a capacitive element;
a parallel circuit having first and second connection points at which the inductive element and the capacitive element are connected to each other in parallel;
a first dual purpose inductance connected between the first connection point of the parallel circuit and the first terminal of the switch; and
a second dual purpose inductance connected between the second connection point of the parallel circuit and the second terminal of the switch, the switch configured to cause the first and second dual purpose inductances to cooperate as a second inductive element in the parallel circuit.

21. The antenna circuit of claim 20 wherein the switch is in an open state when the antenna circuit is configured to transmit an A.C. signal and configured to operate in a reader mode, and wherein the switch is in a closed state when the antenna circuit is configured to transmit data and configured to operate in a card mode.

22. The antenna circuit of claim 20 wherein the first and second dual purpose inductances are sized to match an output impedance of an A.C. signal generation circuit at a frequency of an A.C. transmission signal.

23. The antenna circuit of claim 20 wherein a sum of inductances of the first and second dual purpose inductances is selected to tune the antenna circuit to a frequency of an A.C. signal received from another device when the antenna circuit is excited in a card mode operation.

\* \* \* \* \*